(12) United States Patent
Kovanda et al.

(10) Patent No.: US 8,142,752 B2
(45) Date of Patent: Mar. 27, 2012

(54) METHOD OF PREPARATION OF TALCUM PRODUCT WITH HIGH PURITY DEGREE

(76) Inventors: Ivan Kovanda, Banska Bystrica (SK); Leo Benkovsky, Trnava (SK); Karol Pobis, Banska Bystrica (SK); Jiri Nemec, Trnava (SK); Jana Ondrasikova, Banska Bystrica (SK)

( * ) Notice: Subject to any disclaimer, the term of this patent is extended or adjusted under 35 U.S.C. 154(b) by 190 days.

(21) Appl. No.: 12/528,441

(22) PCT Filed: Feb. 26, 2008

(86) PCT No.: PCT/SK2008/000002
§ 371 (c)(1),
(2), (4) Date: Aug. 24, 2009

(87) PCT Pub. No.: WO2008/105747
PCT Pub. Date: Sep. 4, 2008

(65) Prior Publication Data
US 2010/0034720 A1    Feb. 11, 2010

(30) Foreign Application Priority Data
Feb. 26, 2007  (SK) .................................. 5017-2007

(51) Int. Cl.
*C01B 33/24* (2006.01)
(52) U.S. Cl. ......... 423/331; 423/178; 423/155; 423/561
(58) Field of Classification Search .................. 423/331
See application file for complete search history.

(56) References Cited

FOREIGN PATENT DOCUMENTS

| DE | 4108372 A1 | 9/1992 |
|---|---|---|
| DE | 4225159 A1 | 2/1994 |
| DE | 10125879 A1 | 11/2002 |
| GB | 2211493 A | 7/1989 |
| WO | 9520542 A1 | 8/1995 |
| WO | WO95/20542 | * 8/1995 |

OTHER PUBLICATIONS

International search report for international application No. PCT/SK2008/000002.
Written opinion for international application No. PCT/SK2008/000002.

* cited by examiner

*Primary Examiner* — Melvin Mayes
*Assistant Examiner* — Colette Nguyen
(74) *Attorney, Agent, or Firm* — Oppedahl Patent Law Firm LLC

(57) ABSTRACT

The method which is the subject of protection is characteristic by the fact that firstly is made the suspension consisting of 10 to 20 mass % of mineral talc and 80 to 90 mass % of water; resulting suspension is homogenized and thereafter is heated to the temperature 50° to 70° C. To heated suspension is then added 37% hydrochloric acid in the amount of 1 to 6 mass % under continuous stirring. After reaching pH 3 to 5 and increasing the temperature up to 85° C., to the suspension is then added concentrated sulphuric acid in the amount of 1 to 5 mass %. The suspension is further maintained at the temperature up to 90° C., then it is chilled to the ambient temperature and thereafter is separated the sediment which is finally dried at the temperature 140° to 160° C. after washing with water and reaching pH 5 to 6.

1 Claim, No Drawings

METHOD OF PREPARATION OF TALCUM PRODUCT WITH HIGH PURITY DEGREE

FIELD OF TECHNICS

The invention is related to the method of preparation of talcum product with high purity degree, parameters of which enable its utilization also in the branches where are laid high requirements for quality of input raw materials, for instance pharmaceutical, cosmetic and food industries.

ACTUAL STATE OF THE TECHNICS

The talc is important industrial raw material with broad spectrum of using. It is used in automobile industry at manufacture of automobile parts, in rubber industry at manufacture of tyres, in textile industry for impregnation of materials, in paper industry as paper filler, in building industry at manufacture of various facings, further in chemical industry as catalyzer, carrier of oil colours, it is used also for manufacture of finishes and shoe polishes. Very pure talc is used in cosmetic industry at manufacture of soaps, toothpastes, lipsticks, in pharmaceutical industry as filler in tablet drugs as well as in ceramics manufacturing at production of electrical porcelain. It is predetermined for application in many industries due to its superior physical and chemical properties as are resistance from acids and alkali lyes, low electrical and thermal conductivity, high absorption capacity for binding to fats, oils, colours and resins, excellent cleavability and in the case of superior types, clean white colour.

The talc usually contains various impurities that change its colour and particularly its quality. The talc quality is reduced by all mineral impurities containing $Fe^{3+}$, pyrites and manganese oxide. Talcum mineral from some localities may contain also minor amount of azbestos which is necessary to remove, usually by phosphoric acid effect. Each talc application requires certain degree of processing of this mineral and for purposes of its using, particularly in cosmetics and pharmaceutical industry, it is necessary to treat the mineral to create a suppositions for achieving the product of top quality complying regulations related to qualitative parameters of input materials for production of drugs and cosmetic preparations.

The talc treatment technologies by hydrochloric acid for the purpose of iron content reduction, or by sulphuric acid for the purpose of brightness increase, and by phosphoric acid for the purpose of azbestos content removal (if it is present) are from the viewpoint of the costs very demanding and fail to reach parameters of high-quality input raw material.

The treatment of talcum mineral from the localities where azbestos is not present is described by SK patent No. 278312. According to this patent, the suspension consisting of 74 to 89 mass % of water, 10 to 20 mass % of talcum mineral and 1 to 6 mass % of hydrochloric acid is heated to the temperature 40° C. to 60° C.; after multiple washing with water and after reaching ph 5 to 8, from this reaction mixture is then separated a sediment which is mixed with water and sulphuric acid in the ratio 11 to 21 mass % of the sediment, 69 to 88 mass % of water and 1 to 10 mass % of sulphuric acid. The reaction mixture is then heated to the temperature 75° C. to 125° C., thereafter is separated the sediment which is washed with water several times and after reaching pH 5 to 8 is dryed and sterilized.

Quality of the talc prepared by this method reaches standard level, however the treatment process itself is time-demanding. The costs for energy, water consumption and for waste water disposal are also high because multiple washing of the product is necessary. Therefore the effort is concentrated on continuous improvement of existing technologies of talcum mineral treatment to reach a decrease of total content of undesirable impurities in resulting talcum product, more rational process of the treatment as well as reduced negative impacts of such technology on the environment.

THE INVENTION PRINCIPLE

The principle of a solution according to submitted invention is a new method by which is prepared talcum product with high degree of purity. According to this method is firstly made the suspension out of 10 to 20 mass % of mineral talc without azbestos, and 80 to 90 mass % of water; resulting suspension is homogenized, thereafter it is heated to the temperature 50° to 70° C. and to it is then added 37% hydrochloric acid in the amount of 1 to 6 mass % under continuous stirring. After achieving pH 3 to 5, the temperature of the suspension is increased up to 85° C. and then is added concentrated sulphuric acid in the amount of 1 to 5 mass %. By adding of sulphuric acid it comes to the oxidation of organic residues that the talc contains and so it comes to their releasing. The suspension is maintained at the temperature up to 90° C., then it is chilled to the ambient temperature, thereafter is separated the sediment which is finally dryed at the temperature 140 to 160° C. after washing with water and achieving pH 5 to 6.

Unlike previous technology, hydrochloric acid is added to already created water suspension from the mineral talc and water, which leads to more effective maceration of iron oxide and other impurities of inorganic nature. Whereas the hydrochloric acid is added to water suspension of the talc, preheated to the temperature 50° to 70° C., it significantly reduces the reaction time necessary for the reaction of undesirable impurities with the acid. Hydrochloric acid must be added under stirring gradually to avoid local increase of its concentration, because this may degrade the talc.

Waste acid waters which have been risen at the reactions with acids may be reused in the production process after neutralization and filtration, when there are catched substances soluble in acid medium and approximately 2.7% of the finest particles of the talc.

Waste waters that have been risen due to the product washing, may be used in the production process again after filtration, when the substances soluble in the water as well as the finest portions of the talc are catched.

Submitted technology of the talcum product preparation is less demanding for energy and water consumption in comparison with previous technology—it is spared approximately 45% of energy, and water consumption is reduced as well as the amount of waste waters approximately by 40%. By mentioned method it is reduced a timetable of the talcum product preparation process approximately by 20%, because the process of multiple washing after the reaction with hydrochloric acid is eliminated—it also reduces the talc weight loss.

The talcum product prepared by the method according to submitted invention has a low content of heavy metals—iron 0.01 mass %, negligible content of other metals, e.g. titanium, aluminium, low content of substances soluble in the water—0.09 mass %, and low content of organic residues. Total content of undesirable impurities is up to 0.40 mass %. Qualitative level of the talc prepared by this method exceeds the standard, which allows its utilization also in the branches where are laid very high requirements for input raw material quality.

EXAMPLES OF THE INVENTION IMPLEMENTATION

Several tests have been performed for the purpose of the invention feasibility demonstration and acquisition of the data on qualitative parameters of resulting process product. Procedure of particular operations and conditions under which they were performed are described in details in following example.

Example

Two thousand mL of water is added to the weight of 300 g of mineral talc and the suspension is heated to the temperature 60° C. under intensive stirring. Then is added 12.7 mL of concentrated hydrochloric acid in small amounts and the temperature is maintained for 150 minutes to increase pH of the suspension to the value of 5. The temperature of the suspension is thereafter increased to 85° C. under intensive stirring, then is added 16.4 mL of concentrated sulphuric acid and maintained at the temperature up to 90° C. The suspension is let to cool down after 90 minutes. Further the sedimentation and filtration follow. Resulting sediment is dryed at the temperature 140° C.

The talcum product prepared by this method contained up to 0.40 mass % of undesirable impurities, out of which heavy metals account for 0.153 to 0.165 mass % and substances soluble in the water 0.05 to 0.10 mass %.

Listed parameters comply with the requirements for input raw materials for drug production.

INDUSTRIAL UTILIZATION

The talcum product prepared by the method according to the invention subject is usable in various industries, but mainly in such ones where are laid high requirements for input raw material quality.

The invention claimed is:

1. A preparation method of a talcum product with high purity degree consisting essentially in:
    first, a suspension is made consisting of 10 to 20 weight % of mineral talc and 80 to 90 weight % of water;
    the resulting suspension is homogenized and heated to a temperature of 50° to 70° C.;
    hydrochloric acid in a concentration of 37 weight % is added in an amount of 1 to 6 weight % to the heated suspension under continuous stirring;
    after achieving pH 3 to 5 and increasing the temperature to no more than 85° C., concentrated sulphuric acid in an amount of 1 to 5 weight % is added to the suspension;
    the suspension is further maintained at a temperature of no more than 90° C., then it is chilled to ambient temperature;
    from the suspension, a sediment is separated;
    the sediment is washed with water to reach pH 5 to 6; and
    the sediment is dried at temperature 140 to 160° C., thereby preparing the high-purity talcum product.

* * * * *